United States Patent [19]

Watrous

[11] Patent Number: 4,506,307

[45] Date of Patent: Mar. 19, 1985

[54] MAGNETIC HEAD SLIDER AND ACTUATOR ASSEMBLY

[76] Inventor: Robert B. Watrous, 7208 Golf Course La., San Jose, Calif. 95139

[21] Appl. No.: 320,166

[22] Filed: Nov. 10, 1981

[51] Int. Cl.³ .......................... G11B 5/55; G11B 5/60; G11B 21/10
[52] U.S. Cl. ..................................... 360/106; 310/13; 360/103
[58] Field of Search ............... 360/106, 102, 103, 104; 310/13, 27

[56] References Cited

U.S. PATENT DOCUMENTS 4,322,762  3/1982  Manzke et al. ..................... 360/106
4,396,966  8/1983  Scranton et al. ..................... 360/106

OTHER PUBLICATIONS

IBM Technical Disclosure Bulletin, vol. 21, No. 11, Apr. 1979, pp. 4632–4633, Small Modular/Linear Voice Coil Actuator, Johnson et al.

*Primary Examiner*—George G. Stellar

[57] ABSTRACT

A magnetic head slider and actuator assembly comprises an X-shaped shuttle actuator movable within a slotted portion of a frame within which permanent magnets are positioned. The shuttle actuator supports an electrical coil for interaction with the magnetic flux provided by the magnets, and suspensions on which magnetic head sliders are mounted.

8 Claims, 4 Drawing Figures

MAGNETIC HEAD SLIDER AND ACTUATOR ASSEMBLY

DESCRIPTION

1. Technical Field

This invention relates to a magnetic head slider and actuator assembly used in accessing type disk files.

An object of this invention is to provide a magnetic head slider and actuator assembly having less parts than conventional assemblies employed in disk files.

Another object of this invention is to provide a magnetic head slider and actuator assembly with improved accessing speed capabilities.

Another object is to provide a magnetic head slider and actuator assembly that is easy to manufacture and at less cost than previously known head and actuator assemblies.

2. Background Art

In prior art disk files, the head accessing system includes magnetic transducers, air bearing head sliders to which the transducers are attached, head suspensions on which the sliders are mounted, head arms to which the suspensions are joined, and an actuator, such as a voice coil motor, coupled to the entire assembly. It is apparent that a system of this type has many components, requires many manufacturing steps and processes, as is costly to manufacture and maintain. Also, the magnitude of the moving mass used for accessing to data tracks on a disk surface limits the accessing speed. Other problems, such as misalignment, skewing, inter alia, are experienced with such accessing systems.

CROSS-REFERENCE TO CO-PENDING APPLICATION

A magnetic head slider and actuator assembly which operates without the conventional accessing arm and head suspension is disclosed in copending patent application (IBM Docket SA981020) being filed concurrently. The present invention differs in that spring suspensions are included in the assembly disclosed herein, whereas they are eliminated from the assembly disclosed in the aforementioned patent application.

BRIEF DESCRIPTION OF THE DRAWING

The invention will be described in detail with reference to the drawing in which.

Similar numerals refer to similar elements throughout the drawing.

DISCLOSURE OF THE INVENTION

Figure 1:
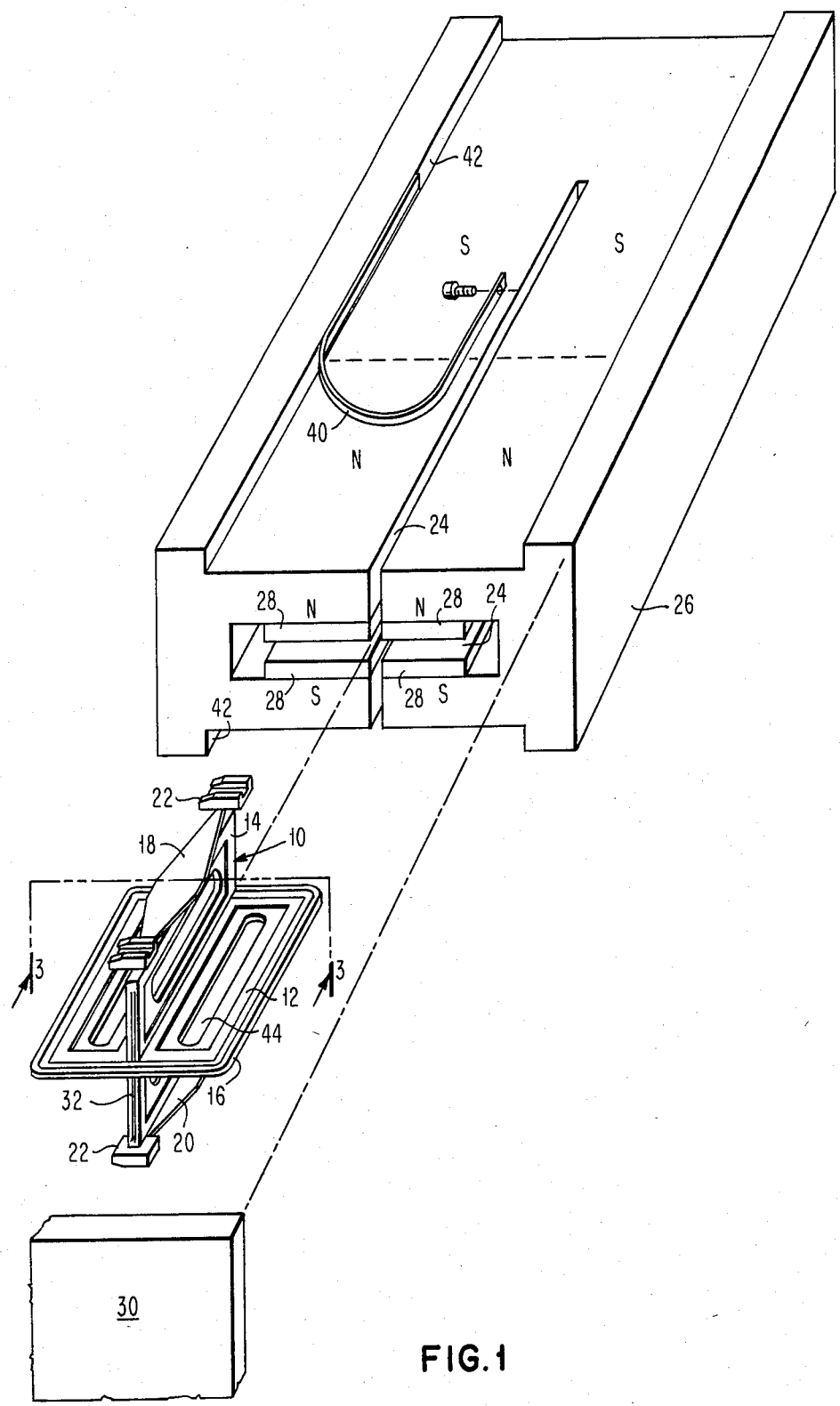
FIG. 1 is an oblique view of a magnetic head slider and actuator assembly, made in accordance with this invention.
Figure 2:
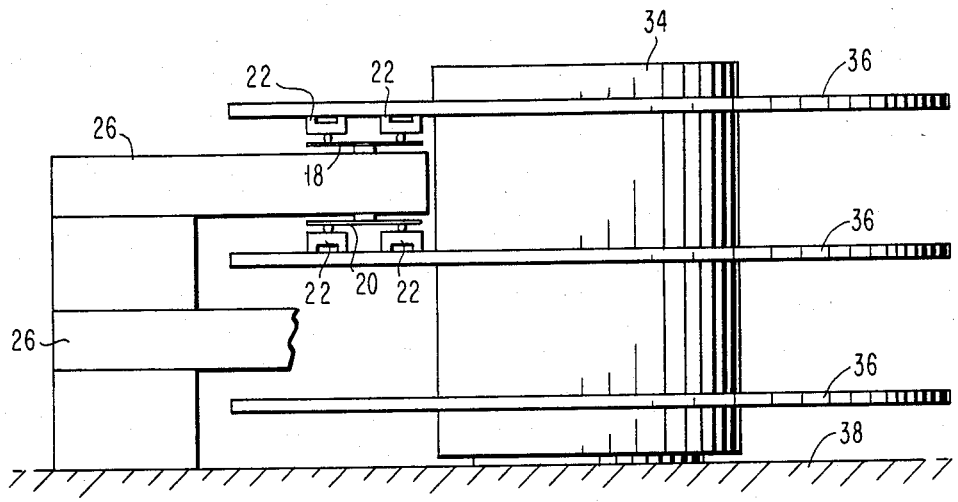
FIG. 2 is a side view of a disk file, incorporating the assembly of this invention.

With reference to FIG. 1, a magnetic head slider and actuator assembly comprises an actuator or shuttle 10, constructed as an X-shaped structure formed by intersecting planar parts 12 and 14, which may be made of ceramic, for example. The horizontal part 12 supports a rectangular coil 16 wound around its periphery, whereas the vertical part 14 supports spring suspensions 18 and 20 which are attached at opposite edges of the part 14. Head sliders 22 are disposed at the ends of the spring suspensions for transducing interaction with rotating magnetic disks 36, as illustrated in FIG. 2.

The shuttle 10 is movable within an X-shaped slotted portion 24 of a stationary frame 26, which is made preferably of soft iron for easy conduction of magnetic flux. The frame 26 houses eight permanent magnets 28 that are positioned to interact with the coil 16, which receives current from a current source (not shown) for actuating the coil and shuttle in a well known manner. The shuttle 10 is movable within a defined distance, such as 40 mm for example, at the central portion of the frame 26. The dashed line represents the center line that bisects the slotted portion 24 of the frame at right angles to the direction of travel of the shuttle along the slot 24. The longitudinal slot 24 ends at a point in the frame so as to act as a stop, which effectively defines the limit of travel of the shuttle 10 in one direction. A stop plate 30 is fastened to the end of the frame to prevent the escape of the shuttle from the frame.

The magnets 28 are so arranged that the polarities of the magnetic flux encompassing the coil 16 will properly interact with the flow of current in the coil, i.e., the current throughout the coil will flow totally clockwise or counterclockwise at any given instant. Current signals to the coil are passed through coil leads 32 that are connected to a flexible wire cable 40, one end of which is fastened to the shuttle 10 and the other end of which is fastened to an inner wall 42 of the frame 26, by epoxy for example. The coil leads are bonded to an edge of the vertical ceramic part 14.

The wire cable 40 also provides leads to conduct current to and from the coils of the magnetic heads.

With reference to FIG. 2, a disk file configuration employing the head slider and actuator assembly of this invention includes a spindle 34 on which a plurality of magnetic disks 36 are mounted for rotation. Between each pair of disks, frame structures 26 are positioned, each frame supporting permanent magnets 28. Suspensions 18 and 20 and sliders 22 are movable relative to the fixed frames and rotary disks for accessing data tracks on the disk surfaces, in a well-known manner. The frame structures are fastened to a baseplate 38 to which the disk drive assembly is mounted.

As illustrated in FIG. 1, the ceramic parts 12 and 14 are formed with shallow recesses 44. These recesses plus the flat areas surrounding them, provide an air bearing effect.

Figure 4:
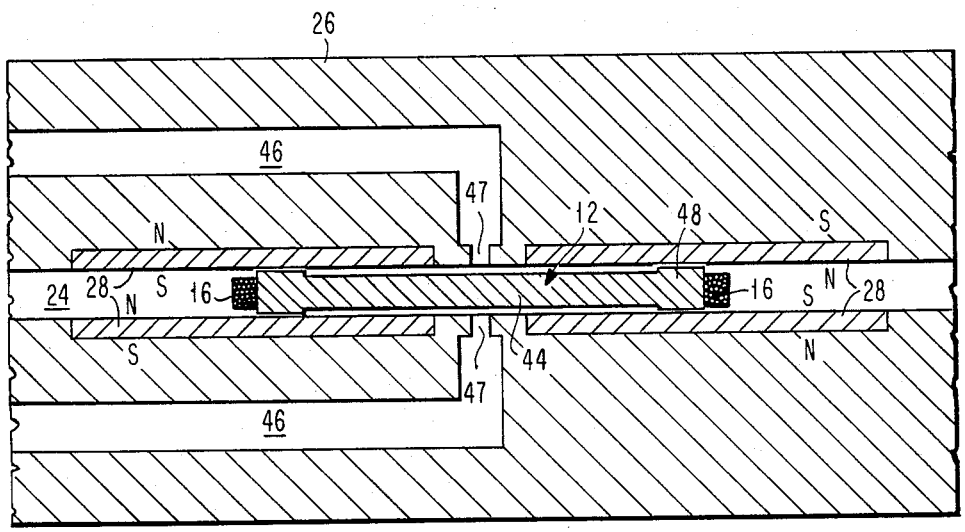
FIG. 4 is a sectional view 4—4 taken through FIG. 3.
Figure 3:
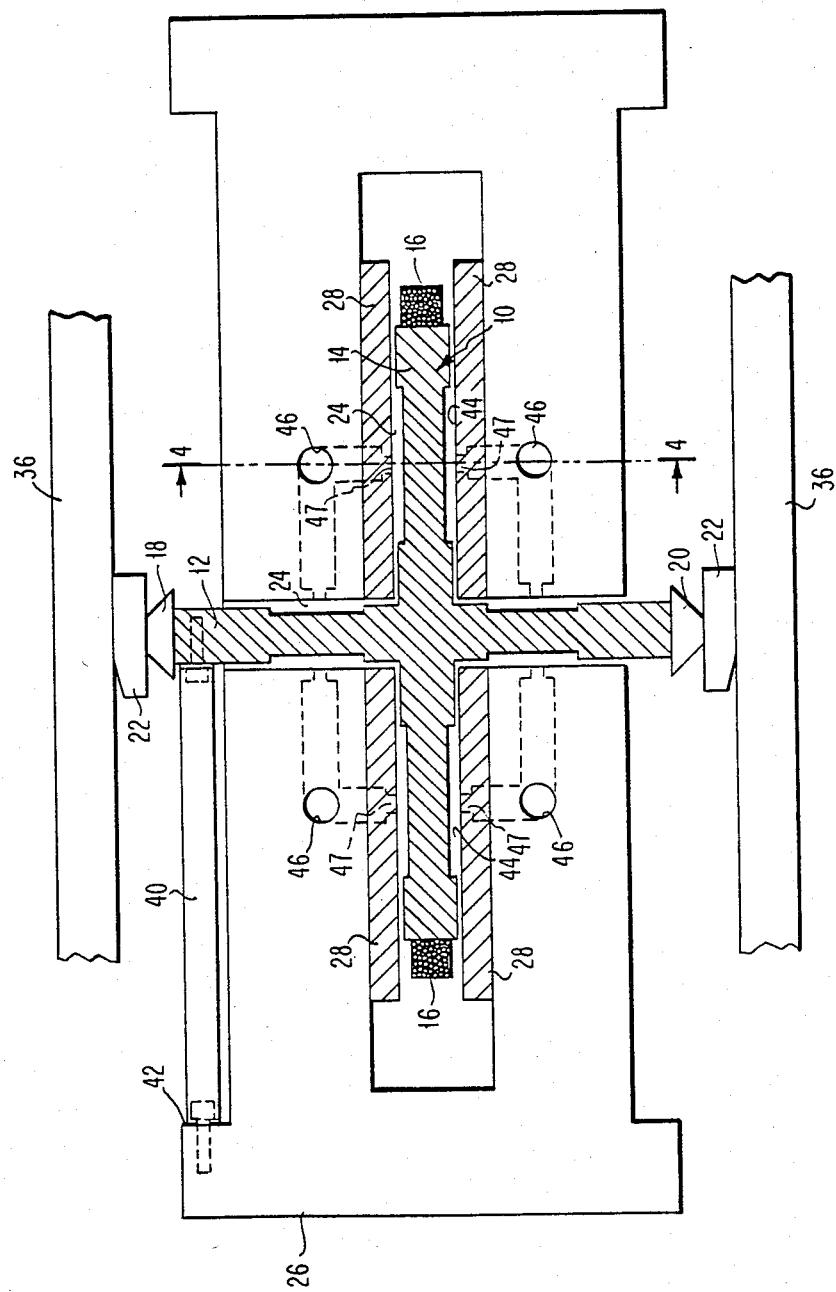
FIG. 3 is an end sectional view 3—3 taken through FIG. 1, depicting the novel assembly.

With reference to FIGS. 3 and 4, air is supplied through air passages 46 to parts 12 and 14. At the end of each air passage adjacent to the parts 12 and 14 is a restrictor aperture 47 that controls the flow of air into the recesses 44. This ensures that air will be supplied to the recesses 44 for all positions of the shuttle 10.

The weight of the shuttle actuator assembly 10 is relatively small so that it can be supported on frictionless air bearings 48. The air bearings 48 are of the externally pressurized type that require a low pressure which is supplied by a blower (not shown), which may be directly attached to the spindle 34. The X-shaped shuttle 10 floats on the air bearings and does not touch the frame during its accessing movement.

In a preferred implementation, each head slider is connected to separate lead wires fixed to each of the four edges of the vertical part 14, and each lead wire set is separately connected to its own flexible wire cable 40 disposed on respective walls 42 of the frame 26.

With the configuration disclosed herein, no head arm structure as found in conventional disk files is required. Also, the low pressure air bearing means precludes the need for a compressor with its attendant cost, weight and reliability problems. Furthermore, the light weight and compactness of the novel actuator provides good dynamic characteristics.

What is claimed is:

1. In an actuator assembly for moving at least one magnetic transducer radially relative to concentric recording tracks on the surface of a rotating magnetic disk on a disk file, said assembly including a movable armature member and a stationary stator member that are movable bidirectionally relative to each other along a predetermined axis parallel to said radial direction in response to the interaction between current flowing in a coil attached to said movable member and the flux produced by permanent magnets attached to said stationary stator member, an improved externally supplied air bearing system arranged to minimize the length of said moving armature member for a given stroke of said actuator assembly in order to reduce the mass of the armature and thereby increase the acceleration and seek time of said actuator, raise the natural frequencies of the armature bearing system, decrease the volume of externally supplied air to said bearing system, and reduce the air pressure required to maintain said armature member in a spaced apart, relatively stiff air bearing relationship relative to said stator member, said system having (a) at least one pair of parallel disposed cooperating air bearing surfaces which guide the mass of said armature during movement, one of which is associated with said stator member and the other of which is associated with said armature member, (b) said armature having a relatively shallow plenum for distributing air equally to said pair of parallel bearing surfaces to establish said relatively stiff air bearing relationship, (c) said other bearing surface of said armature surrounding said plenum and being a continuous bearing surface, a major portion of which is disposed adjacent the perimeter of said armature member and including a pair of segments disposed transverse to said radial direction, and (d) means associated with said stationary member for supplying a predetermined volume of air at a predetermined pressure to said plenum of said armature member, said stroke being substantially equal to the lengthwise dimension of said armature member in said radial direction minus the widths of said pair of segments.

2. The assembly set forth in claim 1 in which said armature includes a second pair of said parallel disposed air bearing surfaces spaced relative to said one pair on the opposite sides of a reference line of said armature which extends parallel to the direction of movement of said armature.

3. The assembly set forth in claim 2 in which said armature further includes third and fourth said pairs of parallel disposed cooperating air bearing surfaces, said third and fourth pairs being disposed in a registry with said one pair and said second pair so as to maintain said armature in a stiff air bearing relationship to said stator during movement.

4. The assembly set forth in claim 3 in which said armature further includes fifth and sixth pairs of cooperating air bearing surfaces disposed transverse to said other pairs to guide said armature in said radial direction during movement.

5. The assembly set forth in claim 4 further including seventh and eighth pairs of cooperating air bearing surfaces which also guide said armature in said radial direction during movement, said fifth and sixth pairs of surfaces being disposed on one side of a plane containing said reference line and said seventh and eighth pair of surfaces being disposed on the other side of said plane containing said reference line.

6. The assembly set forth in claim 5 further including a magnetic transducer and means for mounting said magnetic transducer to said movable armature including a spring member for biasing said magnetic heads against said disk.

7. The assembly set forth in claim 5 further including a plurality of air passages each of which includes an orifice disposed in said stator and arranged to supply air to each plenum defined by said other bearing surface of said pair of cooperating bearing surfaces.

8. The assembly set forth in claim 7 in which said plurality of air passages are adapted to be supplied from a common supply of air having said predetermined pressure.

* * * * *

UNITED STATES PATENT AND TRADEMARK OFFICE
CERTIFICATE OF CORRECTION

PATENT NO. : 4,506,307
DATED : March 19, 1985
INVENTOR(S) : Robert B. Watrous

It is certified that error appears in the above—identified patent and that said Letters Patent is hereby corrected as shown below: On the title page;

Omission of Assignee: International Business Machines Corporation

Signed and Sealed this

Seventeenth Day of September 1985

[SEAL]

*Attest:*

DONALD J. QUIGG

*Attesting Officer*

*Commissioner of Patents and Trademarks—Designate*